(12) United States Patent
Tseng

(10) Patent No.: US 8,556,503 B2
(45) Date of Patent: Oct. 15, 2013

(54) ELECTRONIC CLINICAL THERMOMETER

(75) Inventor: Chao-Man Tseng, New Taipei (TW)

(73) Assignee: K-Jump Health Co., Ltd., New Taipei (TW)

( * ) Notice: Subject to any disclaimer, the term of this patent is extended or adjusted under 35 U.S.C. 154(b) by 1 day.

(21) Appl. No.: 13/341,637

(22) Filed: Dec. 30, 2011

(65) Prior Publication Data

US 2012/0099617 A1 Apr. 26, 2012

Related U.S. Application Data

(63) Continuation-in-part of application No. 12/397,622, filed on Mar. 4, 2009, now abandoned, which is a continuation-in-part of application No. 12/113,957, filed on May 2, 2008, now abandoned.

(30) Foreign Application Priority Data

Nov. 10, 2011 (TW) .............................. 100221188 U

(51) Int. Cl.
*G01K 7/00* (2006.01)
(52) U.S. Cl.
USPC ........................................................ 374/170
(58) Field of Classification Search
USPC ........................................................ 374/170
See application file for complete search history.

(56) References Cited

U.S. PATENT DOCUMENTS

| | | | | |
|---|---|---|---|---|
| 5,575,563 A * | 11/1996 | Chiu et al. | ..................... | 374/141 |
| 6,236,874 B1 * | 5/2001 | Devlin et al. | ................. | 600/372 |
| 6,591,739 B2 * | 7/2003 | Norcross | .......................... | 99/342 |
| 6,957,911 B2 * | 10/2005 | Wong et al. | .................... | 374/208 |
| 7,293,915 B2 * | 11/2007 | Chen | .............................. | 374/163 |
| 7,815,367 B2 * | 10/2010 | Lane et al. | ..................... | 374/121 |
| 2002/0073853 A1 * | 6/2002 | Norcross | .......................... | 99/342 |
| 2009/0274192 A1 * | 11/2009 | Tseng | ............................ | 374/170 |
| 2010/0123577 A1 * | 5/2010 | Chang | ........................... | 340/540 |

FOREIGN PATENT DOCUMENTS

GB 2075194 A * 11/1981

* cited by examiner

*Primary Examiner* — Lisa Caputo
*Assistant Examiner* — Jamel Williams
(74) *Attorney, Agent, or Firm* — Chun-Ming Shih; HDLS IPR Services

(57) ABSTRACT

An electronic clinical thermometer for connecting to an electronic device includes a sensing portion comprising and a controlling portion. The sensing portion includes a first audio connecting member and the controlling portion includes a second audio connecting member. The second audio connecting member is assembled with the first audio connecting member to connect the sensing portion and the controlling portion. Thereby, the second audio connecting member is used for connecting to the electronic device and achieving bidirectional communication when the first audio connecting member and the second audio connecting member are separated.

2 Claims, 9 Drawing Sheets

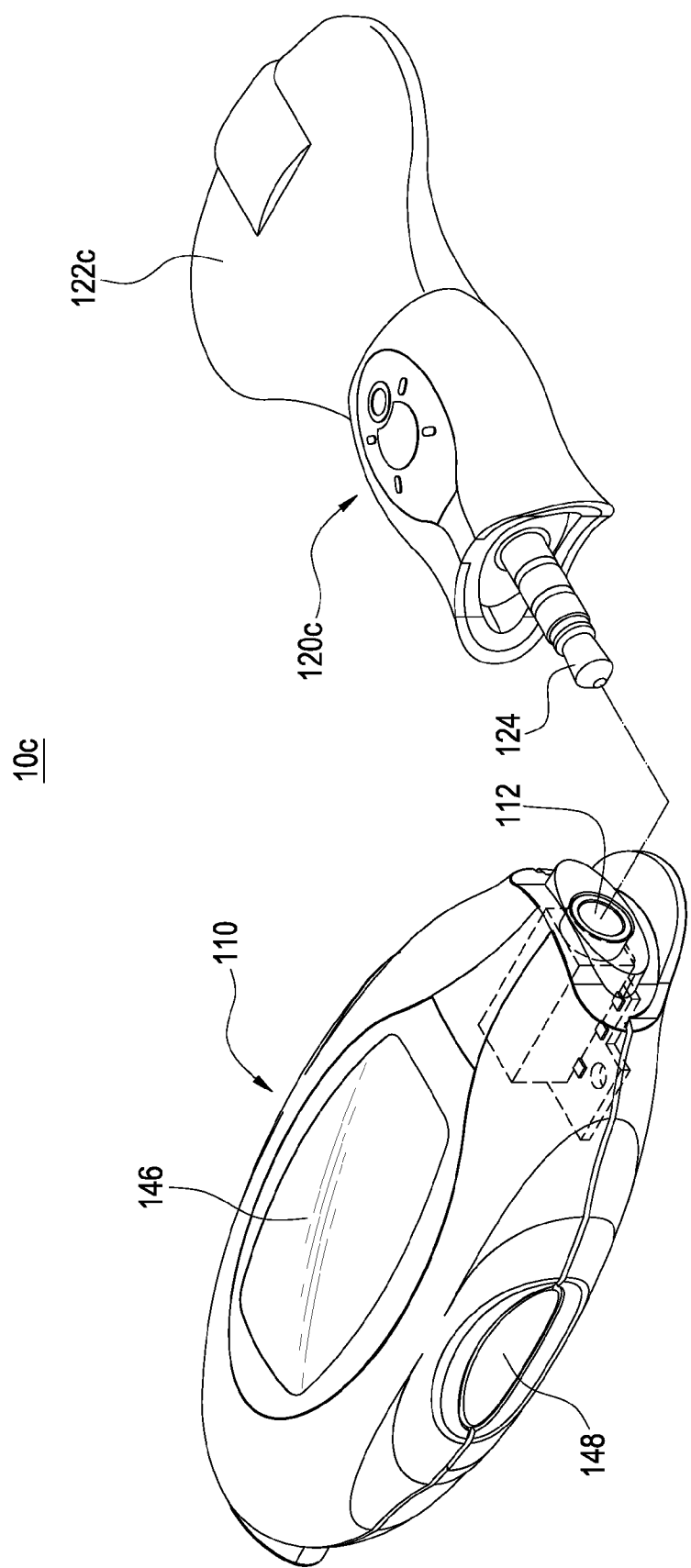

ELECTRONIC CLINICAL THERMOMETER

CROSS-REFERENCE TO RELATED APPLICATIONS

This application is a Continuation-In-Part of U.S. application Ser. No. 12/397,622, filed Mar. 4, 2009 now abandoned, which is a Continuation-In-Part of U.S. application Ser. No. 12/113,957, filed May 2, 2008, now abandoned.

BACKGROUND OF THE INVENTION

1. Field of the Invention

The present invention relates to a temperature detecting device, especially to a replaceable electronic clinical thermometer achieving bidirectional communication with an electronic device.

2. Description of Prior Art

Generally, in the principle for the measurement of electronic clinical thermometer, a count circuit calculates a base time period for a specific time of an oscillation circuit formed by a reference resistor and a capacitor connected to the counting circuit externally. Then the circuit is switched to a temperature sensitive resistor and the capacitor mentioned above. The number of times for the oscillation between the temperature sensitive resistor and the capacitor above mentioned is calculated. The result is operated in a microprocessor and is converted to a data which is then transferred to a display.

Since technology has improved greatly, for home used electronic clinical thermometers, it has no doubt to the sanitation of human body, but in medical location the electronic clinical thermometers are used for many patients, even they are sterilized in alcohol, while the people do not fully believe the safety use if the electronic clinical thermometers. To avoid infection, the electronic clinical thermometers are sterilized before use with a long and tedious process.

SUMMARY OF THE INVENTION

It is an object of the present invention to provide an electronic clinical thermometer, the controlling portion and the sensing portion of the electronic clinical thermometer may be separated, thereby the temperature sensing member is replaceable so as to avoid infection, and the controlling portion may connect to an electronic device when the controlling portion and the sensing portion are separated.

It is another object of the present invention to provide an electronic clinical thermometer, the controlling portion and the sensing portion of the electronic clinical thermometer may be separated, thereby the temperature sensing member is replaceable to avoid infection, and the electronic clinical thermometer can directly connected to the controlling portion and achieving bidirectional communication.

Accordingly, the electronic clinical thermometer according to one aspect of the present invention is used for connecting to an electronic clinical thermometer. The electronic clinical thermometer includes a sensing portion comprising and a controlling portion. The sensing portion includes a first audio connecting member and the controlling portion includes a second audio connecting member. The second audio connecting member is assembled with the first audio connecting member to connect the sensing portion and the controlling portion. Thereby, the second audio connecting member is used for connecting to the electronic device and achieving bidirectional communication when the first audio connecting member and the second audio connecting member are separated.

Accordingly, the electronic clinical thermometer according to another aspect of the present invention is used for connecting to the electronic device. The electronic clinical thermometer includes a sensing portion and controlling portion. The sensing portion includes a first audio connecting member, and the controlling portion includes a second audio connecting member and a third audio connecting member. The second audio connecting portion is assembled with the first audio connecting member to connect the sensing portion and the controlling portion, the third audio connecting member is connected to the electronic device.

In the present invention, the second audio connecting member of the controlling portion is assembled to the first audio connecting member of the sensing portion to connect the controlling portion and the sensing portion. Thereby, user can select a suitable temperature sensing member so as to enhance convenient of using and avoid infection. And the controlling portion and the electronic device can achieve data transmission and functions setting.

BRIEF DESCRIPTION OF DRAWING

The features of the invention believed to be novel are set forth with particularity in the appended claims. The invention itself however may be best understood by reference to the following detailed description of the invention, which describes certain exemplary embodiments of the invention, taken in conjunction with the accompanying drawings in which:

FIG. 9 is an exploded perspective view of an electronic clinical thermometer according to a fourth preferred embodiment of the present invention.

DETAILED DESCRIPTION OF THE INVENTION

Figure 1:
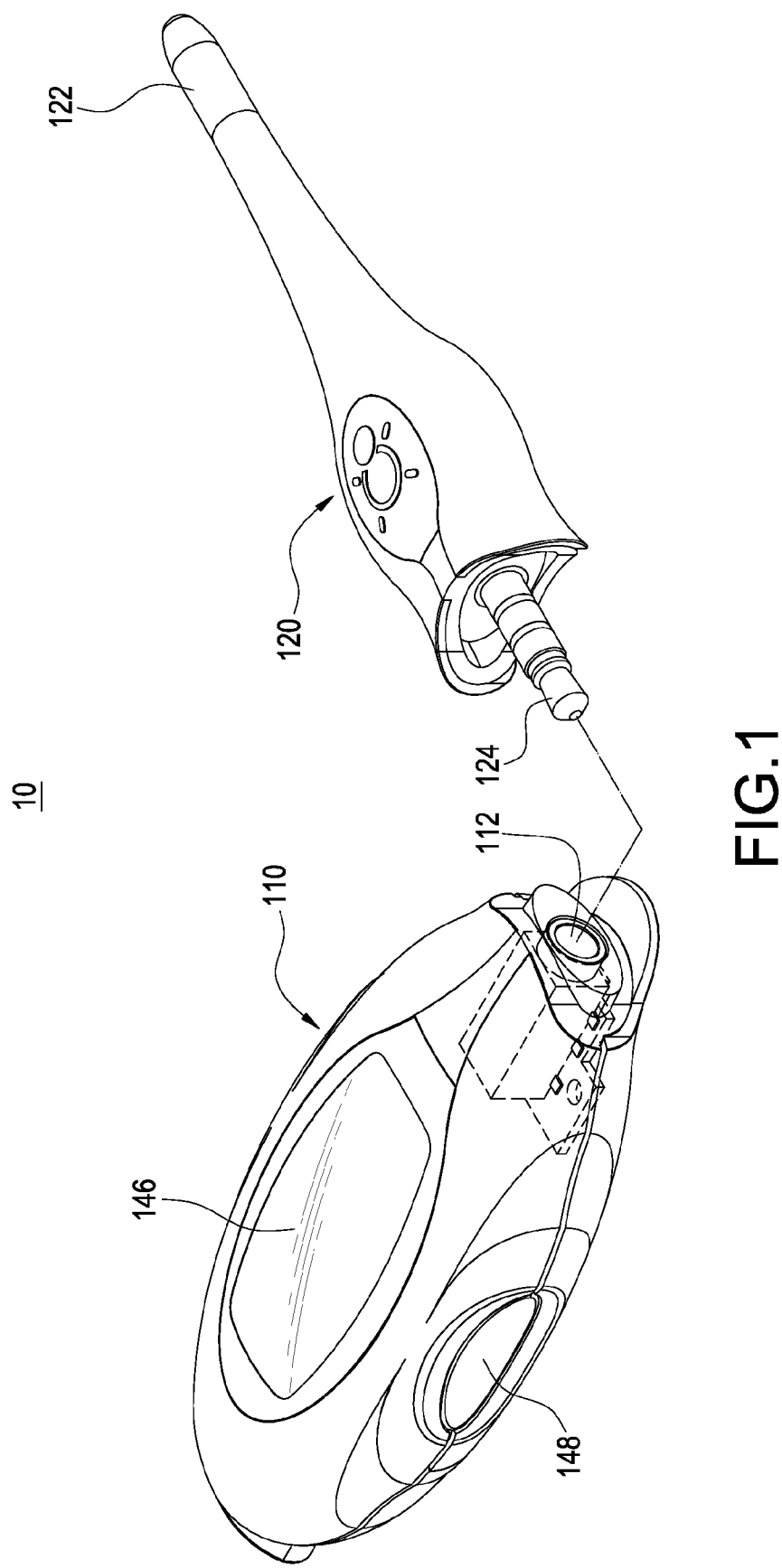
FIG. 1 is an exploded perspective view of an electronic clinical thermometer according to a first preferred embodiment of the present invention FIG. 2 an assembled view of the electronic clinical thermometer according to the first preferred embodiment of the present invention

Reference will now be made in detail to the present embodiments of the invention, examples of which are illustrated in the accompanying drawings. Wherever possible, the same reference numbers are used in the drawings and the description to refer to the same or like parts.

Figure 2:
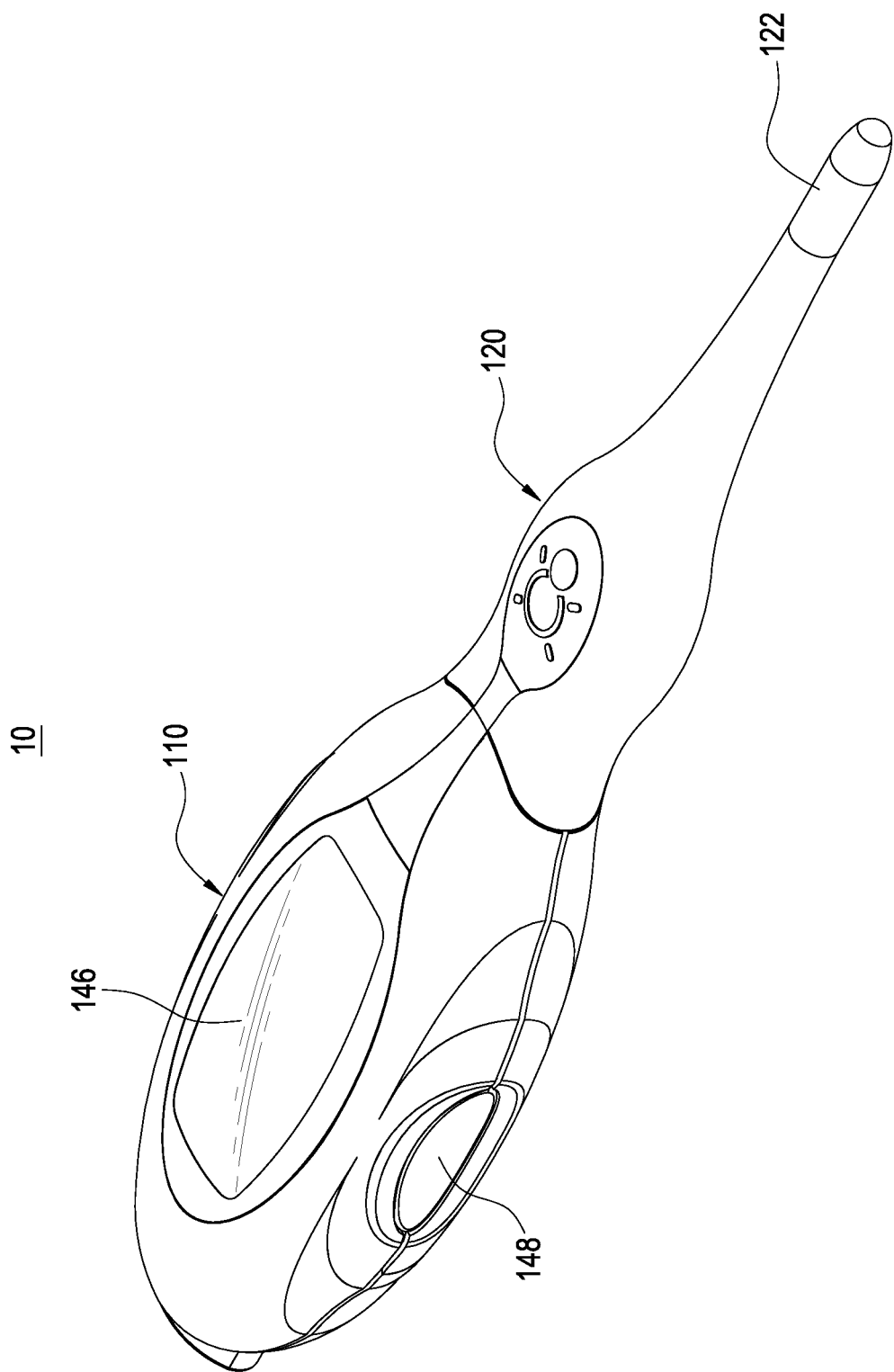

Reference is made to FIG. 1 and FIG. 2, which are respectively an exploded perspective view and an assembled view of an electronic clinical thermometer according to a first preferred embodiment of the present invention. The electronic clinical thermometer 10 includes a controlling portion 110 and a sensing portion 120. The sensing portion 120 includes a temperature sensing member 122 and a first audio connecting member 124 electrically connected to the temperature sensing member 122. The first audio connecting member 124 may be audio socket or phone jack, and in this embodiment, the first audio connecting member 124 is, for example, a phone jack.

Figure 8:
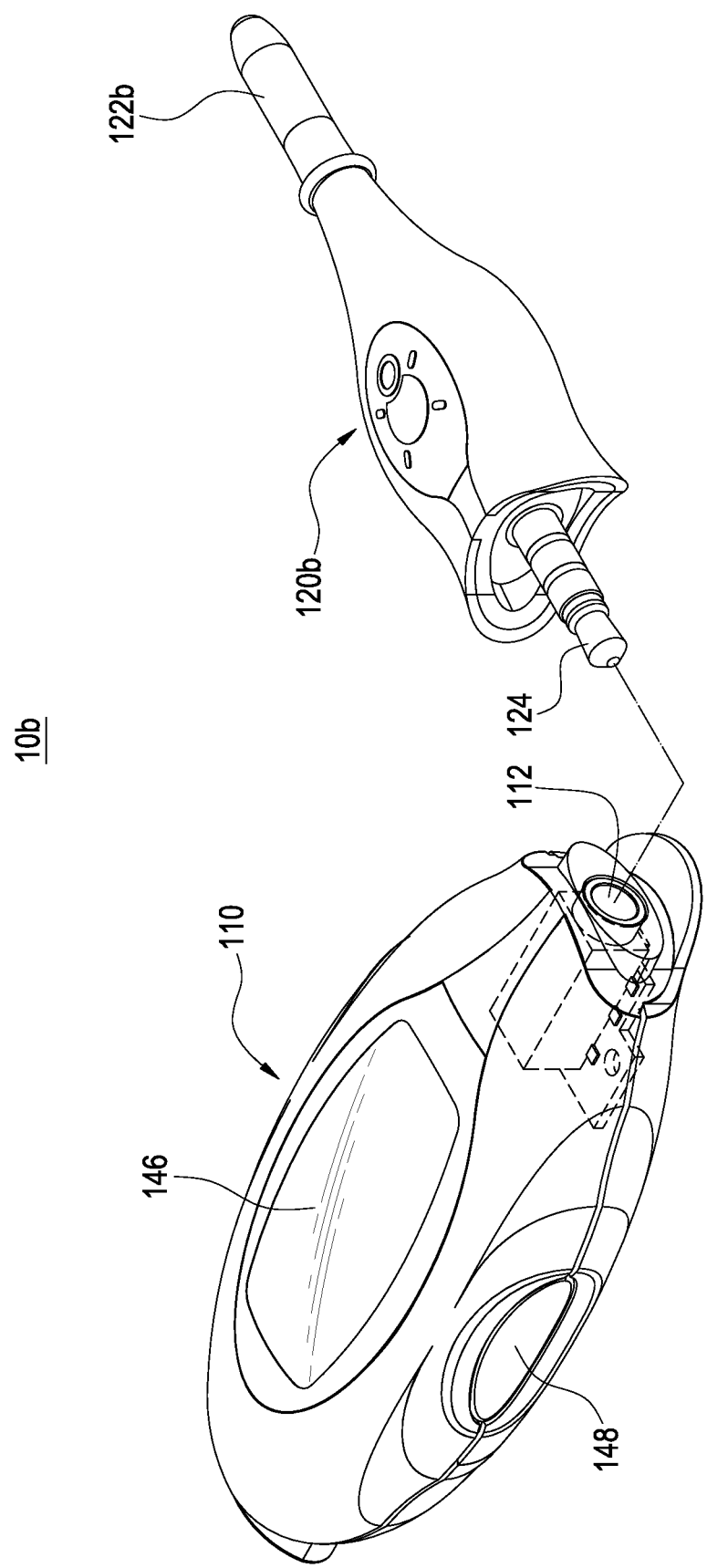
FIG. 8 is an exploded perspective view of an electronic clinical thermometer according a third preferred embodiment of the present invention.

The temperature sensing member 122 is preferably disposed on the sensing portion 120 at a location opposite to the first audio connecting member 124 and used for measuring a body temperature. In this embodiment, the temperature sensing member 122 is of long and slender shape and provided to measure temperature of armpit. In the practical application, a sensing portion 122b of a temperature sensing member 120b shown in FIG. 8 is of short-planiform shape and provided to measure temperature of anus, and a sensing portion 122c of a temperature sensing member 120c shown in FIG. 9 is of flat and elliptical shape and provided to measure temperature if tongue.

The controlling portion 110 includes a second audio connecting member 112. The second audio connecting member 112 may be an audio socket or a phone jack, and in this embodiment, the second audio connecting member 112 is, for example, an audio socket. The first audio connecting member 124 is assembled with the second audio connecting member 112 to connect the controlling portion 110 and the sensing portion 120, thereby signal and power source can transmit between the controlling portion 110 and the sensing portion 120.

Figure 3:
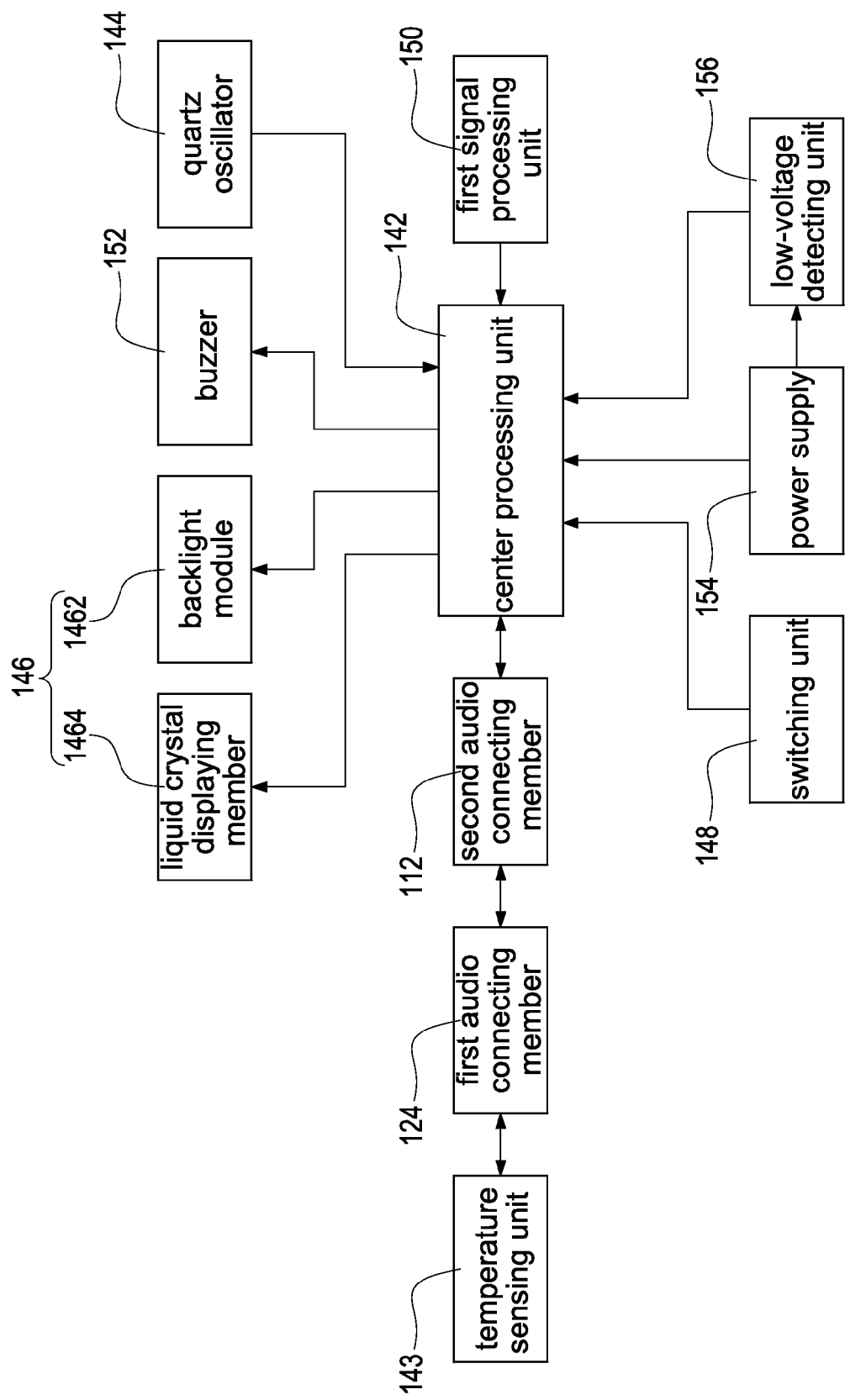
FIG. 3 is a circuit block diagram of the electronic clinical thermometer according to the first preferred embodiment of the present invention.

With reference to FIG. 3, FIG. 3 is a circuit block diagram of the electronic clinical thermometer according to the first preferred embodiment of the present invention. The electronic clinical thermometer 10 includes a center processing unit 142, a temperature sensing unit 143, a quartz oscillator 144, a displaying unit 146, a switching unit 148, a first signal processing unit 150, a buzzer 152, a power supply 154 and a low-voltage detecting unit 156.

The center processing unit 142 is to coordinate and direct all the data transmission and operations between the elements and units and provides functions of calculation, setting, recording, etc. The center processing unit 142 is electrically connected to the second audio connecting member 112, the quartz oscillator 144, the displaying unit 146, the switching unit 148, the first signal processing unit 150, the buzzer 152, the power supply 154 and the low-voltage detecting unit 156.

The temperature sensing unit 143 is disposed on the sensing portion 120 and electrically connected to the first audio connecting member 124. By the assembled first audio connecting member 124 and the second audio connecting member 112, the temperature sensing unit 143 is electrically connected to the center processing unit 142 and receives driving signal for measuring temperature of a measured body generated by the center processing unit 142. After that, the temperature sensing unit 143 generates a temperature signal and transmits the temperature signal to the center processing unit 142 through the assembled first audio connecting member 124 and second audio connecting member 112.

The quartz oscillator 144 is disposed on the controlling portion 110 for generating a timing signal, and the timing signal is transmitted to the center processing unit 142 and showing on the displaying unit 146.

The displaying unit 146 is disposed in the controlling portion 110 for showing measuring value, operation mode and using status. The displaying unit 146 includes a backlight module 1462 and a liquid crystal displaying member 1464, the backlight module 1462 and the liquid crystal displaying member 1464 are electrically connected to the center processing unit 142, respectively. The backlight module 1462 provides light source for displaying images and the liquid crystal displaying member 1464 is used for displaying images. In this embodiment, the displaying unit 146 can show user, measuring time and temperature in the same time, and the data mentioned above is also stored in the center processing unit 142.

The switching unit 148 is disposed on the controlling portion 110 (as shown in FIG. 1). The switching unit 148 is adapted to user for turning on or turning off the electronic clinical thermometer 10, and activating the temperature sensing unit 143 to measure temperature and selecting the operating mode and setting. Certainly, the switching unit 148 may also be disposed on the sensing portion 120.

The first signal processing unit 150 is electrically connected to the center processing unit 142 and the second audio connecting unit 110. The first signal processing unit 150 provides functions of amplifying, filtering and signal converting to convert signal into required form. The buzzer 152 is disposed on the controlling portion 110 and electrically connected to the center processing unit 142, and provides function of prompting, such as starting prompt and finishing measure prompt.

The power supply 154 is, for example, battery and disposed on the controlling portion 110 for providing the electric power of the electronic clinical thermometer 10. The low-voltage detecting unit 156 is electrically connected to the power supply 154 and the center processing unit 142 and provides an alarming signal to the center processing unit 142 when the electric power is below a predetermined threshold. The center process unit 142 alarms user that the power supply 154 is being exhausted by displaying unit 146 or the buzzer 152.

Figure 4:
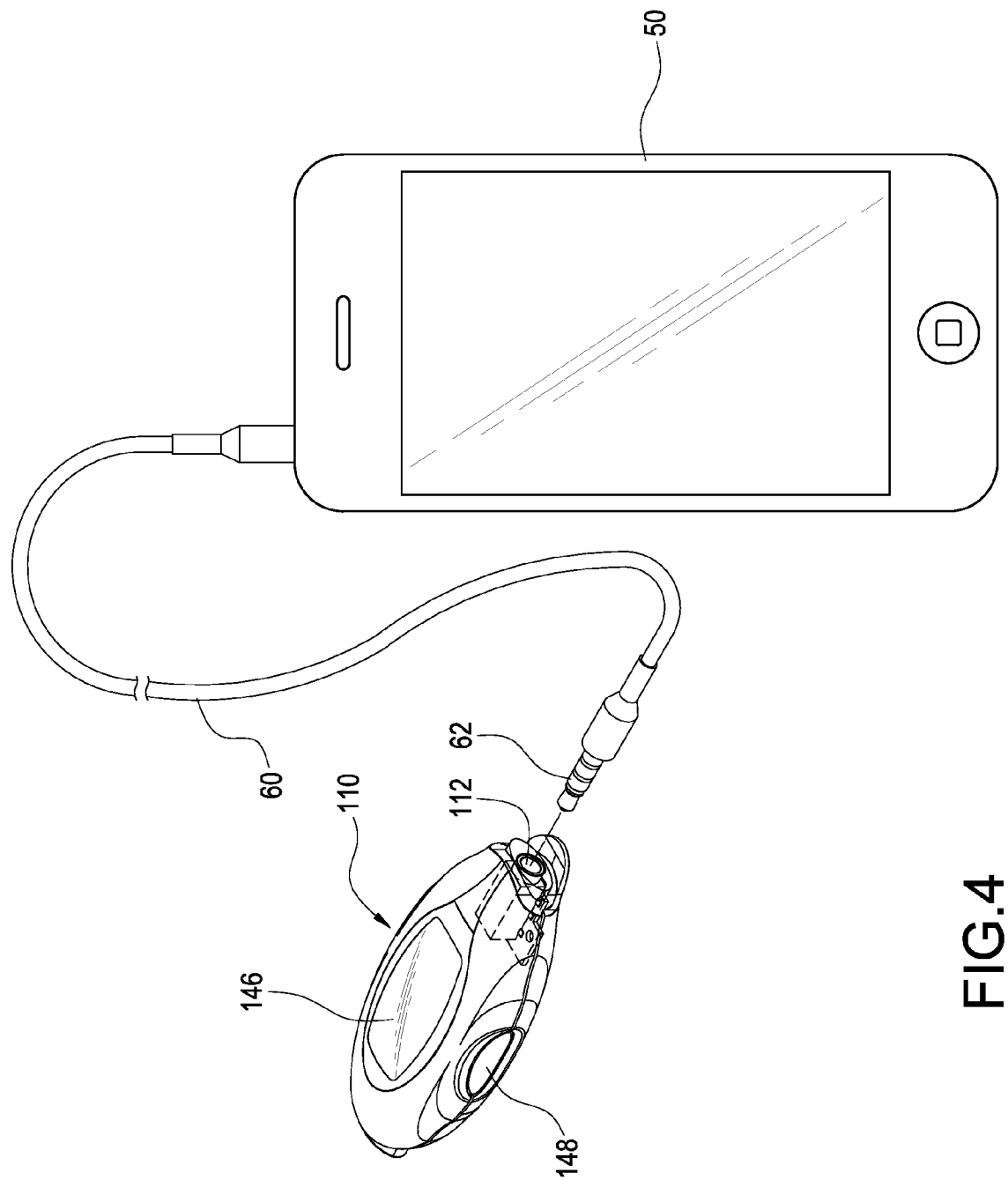
FIG. 4 is a schematic view of connected electronic clinical thermometer and electronic device according to the first preferred embodiment of the present invention.
Figure 5:
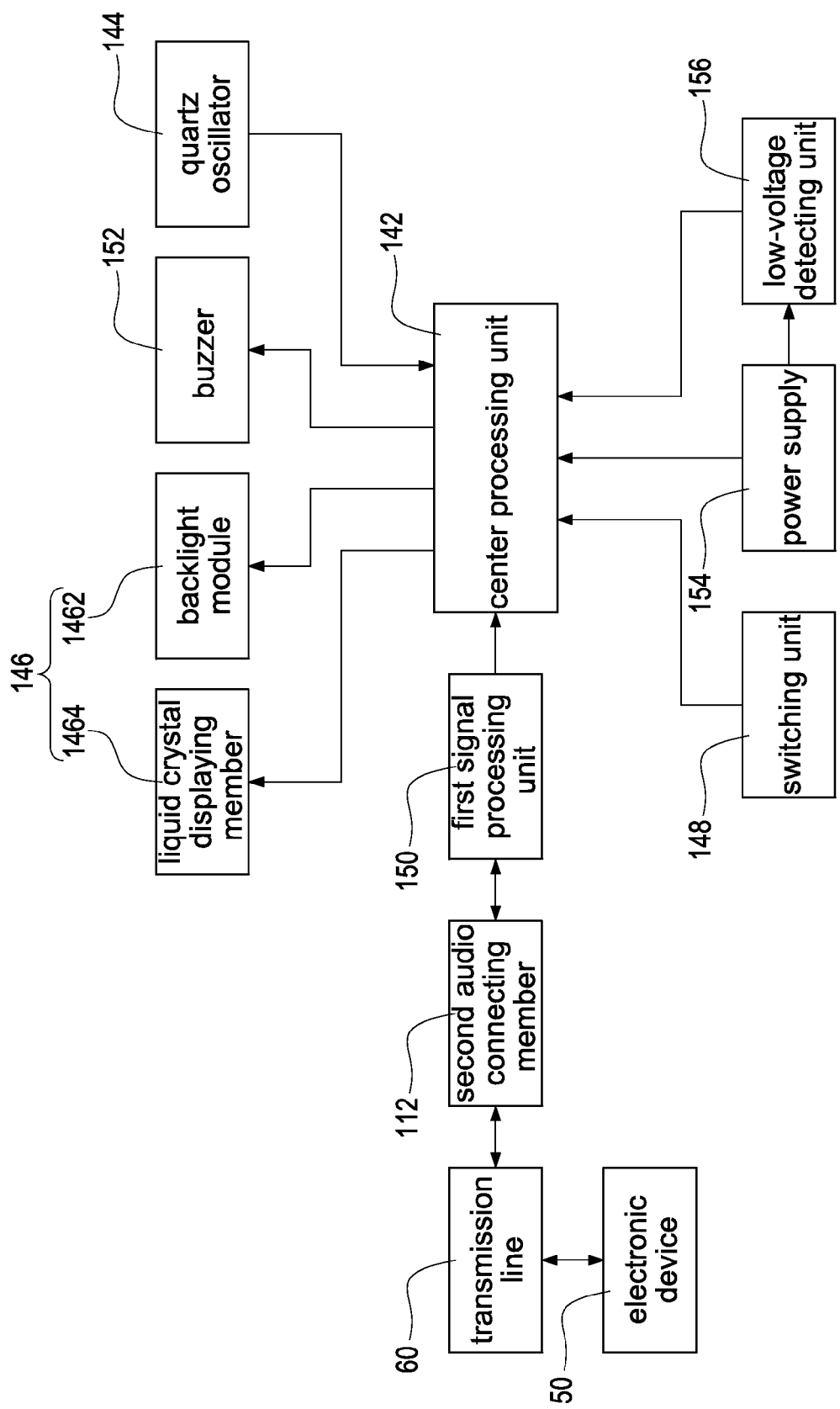
FIG. 5 is a circuit block diagram of the connected electronic clinical thermometer and electronic device according to the first preferred embodiment of the present invention.

Reference is made to FIG. 4 and FIG. 5, which are respectively a schematic view and circuit block diagram of connected electronic clinical thermometer and electronic device according to the first preferred embodiment of the present invention. An electronic device 50 is connected to the controlling portion 110 through a transmission line 60 having at least a phone jack 62 for getting the data recorded in the center processing unit 142. In this embodiment, the electronic device 50 is, for example, a mobile phone, and the transmission line 60 preferably has two phone jacks 62 at the two ends for respectively assembling to the controlling portion 110 and the electronic device 50 to connect the controlling portion 110 and the electronic device 50. The data recorded in the controlling portion 110 is transmitted to the electronic device 50 through the first signal processing unit 150, assembled second audio connecting member 112 and phone jack 62 and the transmission line 60. The electronic device 50 may record, analyze and display the data and achieve diversifying display, such as, chart displaying.

In addition, the electronic device 50 is also transmitting controlling codes to the electronic clinical thermometer 10 through the transmission line 60 and the assembled phone jack 62 and the second audio connecting member 112. After that, the controlling codes are transmitted to the center controlling unit 142 through the first signal processing unit 150 to convert into the suitable from for the center processing unit 142. Thereby, the controlling codes of the electronic clinical thermometer 10 may be changed and updated. Furthermore, the electronic device 50 may set the usage function of the electronic clinical thermometer 10, such as, time, user, etc. Certainly, when the second audio connecting member 112 is phone jack, the second audio connecting member 112 may directly be assembled with the electronic device 50 and achieve bidirectional communication.

Figure 6:
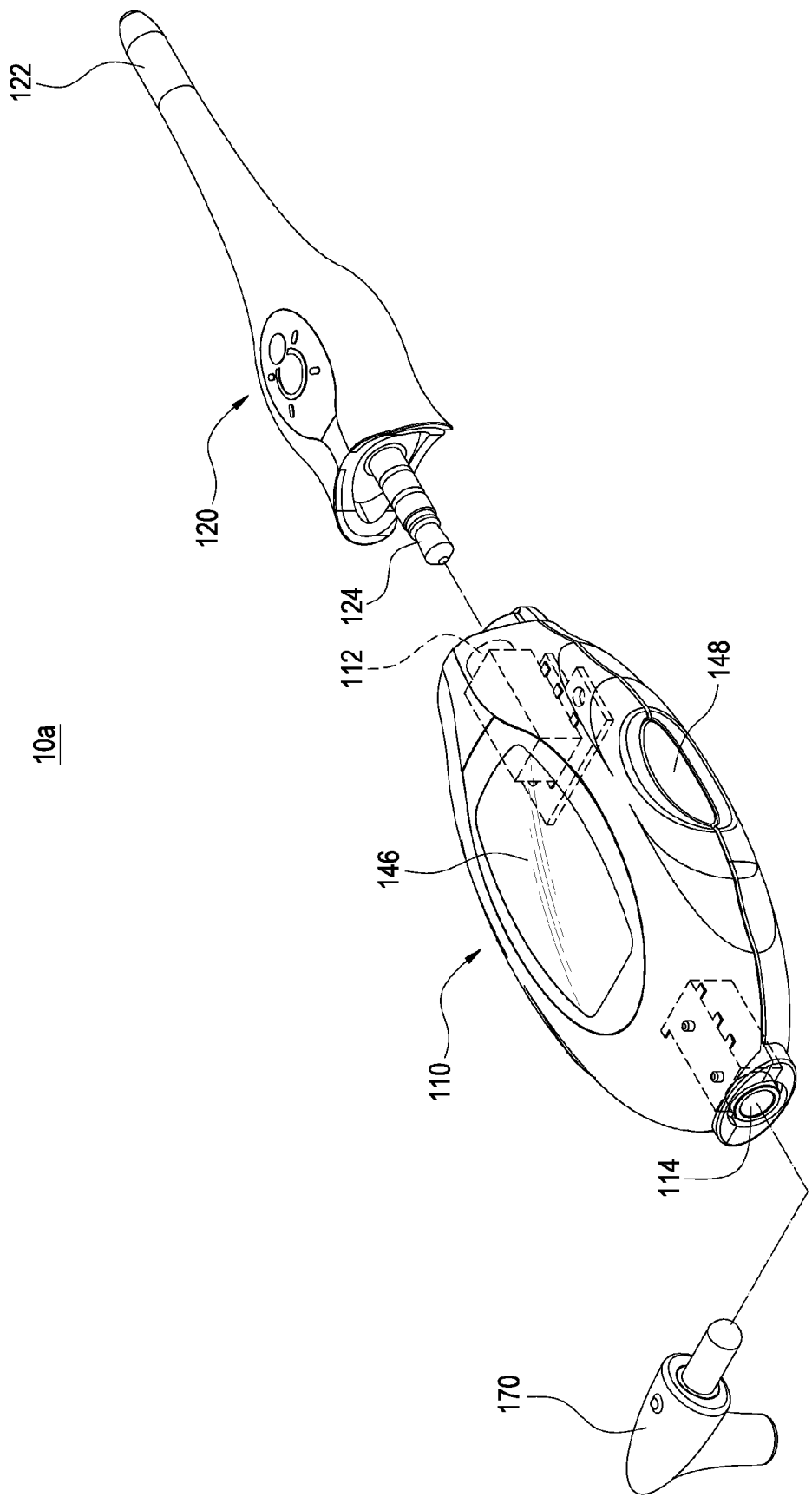
FIG. 6 is an exploded perspective view of an electronic clinical thermometer according to a second preferred embodiment of the present invention.
Figure 7:
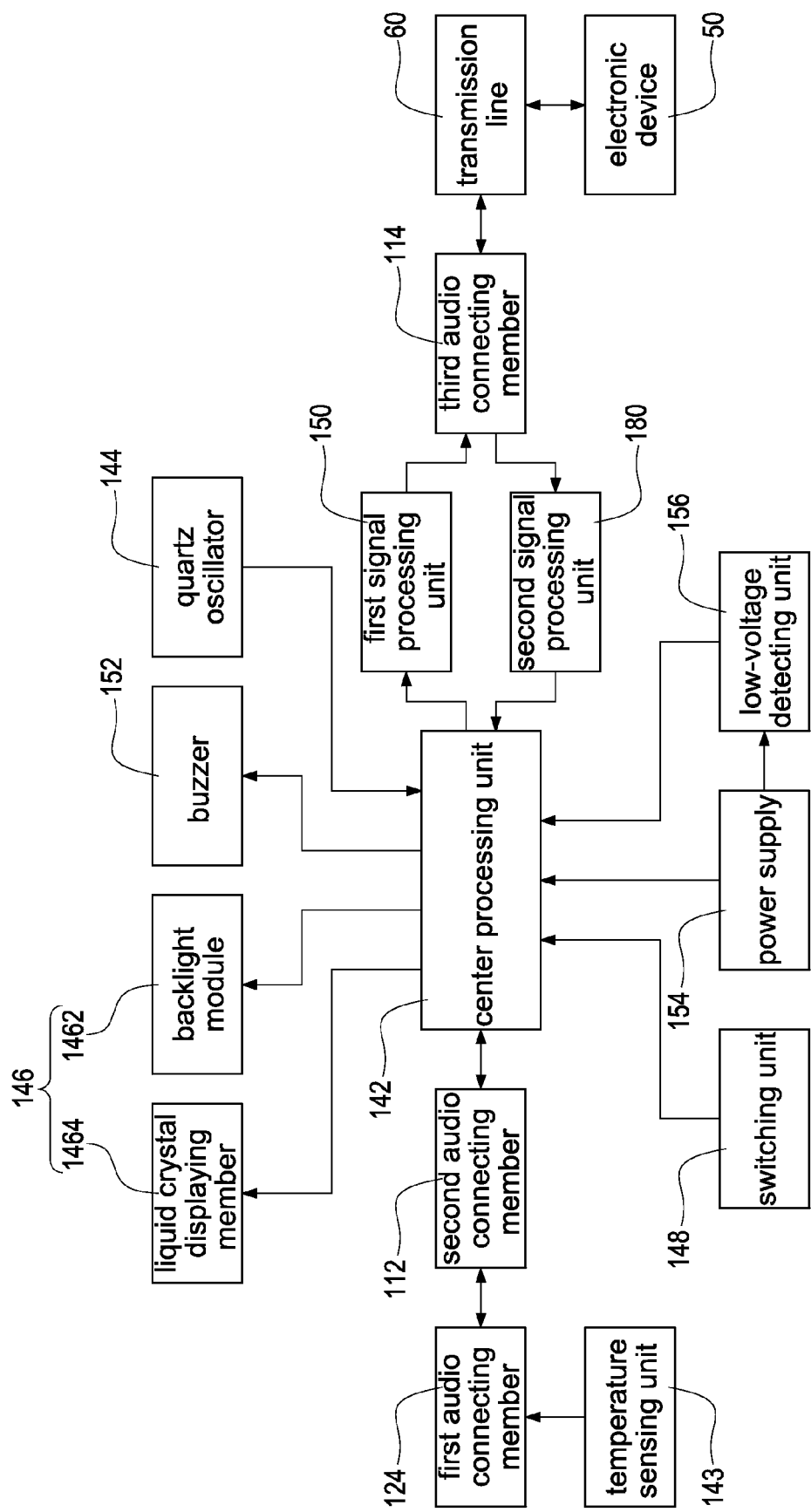
FIG. 7 is a circuit block diagram of the electronic clinical thermometer according to the second preferred embodiment of the present invention.

Reference is made to FIG. 6 and FIG. 7, which are respectively an exploded perspective view and a circuit block diagram of an electronic clinical thermometer according to a second embodiment of the present invention. The electronic clinical thermometer 10*a* is similar to the first embodiment, but the different is that the electronic clinical thermometer 10*a* further includes a third audio connecting member 114 and a second signal processing unit 180. The third audio connecting member 114 is disposed on the controlling portion 110 at the position opposite to the second audio connecting member 112. The first processing unit 150 is electrically connected to the third audio connecting member 114 and provides function of signal filtering. The data of the electronic clinical thermometer 10*a* is filtered by the first signal processing unit 150 and then transmits to the electronic device 50 through the third audio connecting member 114. The third audio connecting member 114 may be audio socket or phone jack, and in this embodiment, the third audio connecting member 114 is, for example, an audio socket.

The second signal processing unit 180 is electrically connected to the center processing unit 142 and the third audio connecting member 114 and provides function of amplifying. The controlling codes is transmitted to the electronic clinical thermometer 10*a* through the electronic device 50, the third audio connecting member 114 and amplifying by the second signal processing unit 180. The electronic clinical thermometer 10*a* transmits data to the electronic device 50 through the first signal processing unit 150 and assembled third audio connecting member 114 and the phone jack of the transmission line 60, and the electronic device 50 transmits controlling codes to the electronic clinical thermometer 10*a* through assembled phone jack of the transmission line 60 and the third audio connecting member 114 and the second signal processing unit 180. Thereby, the circuit design of the first signal processing unit 150 and the second signal processing unit 180 may be simplified and can prevent signal interference. In addition, the first signal processing unit 150 and the second signal processing unit 180 may be an independent element, or be integrated into a single element. When the second audio connecting member 112 is a phone jack, the second audio connecting member 112 can directly assemble with the electronic device 50 and achieve bidirectional communication.

In addition, the electronic clinical thermometer 10 includes a protective cover 170 (as shown in FIG. 6). The protective cover 170 is covered the third audio connecting member 114 to prevent dust from attaching the third audio connecting member 114 and moisture from permeating into the third audio connecting member 114.

To sum up, in the present invention, the second audio connecting member 112 of the controlling portion 110 is assembled to the first audio connecting member 124 of the sensing portion 120, 120*b*, 120*c* to connect the controlling portion 110 and the sensing portion 120. Thereby, user can select a suitable temperature sensing member 122, 122*b*, 122*c* so as to enhance convenient of using and avoid infection. And the controlling portion 110 and the electronic device 50 can achieve data transmission and functions setting.

Although the present invention has been described with reference to the preferred embodiment thereof, it will be understood that the invention is not limited to the details thereof. Various substitutions and modifications have suggested in the foregoing description, and other will occur to those of ordinary skill in the art. Therefore, all such substitutions and modifications are intended to be embraced within the scope of the invention as defined in the appended claims.

What is claimed is:

1. An electronic clinical thermometer comprising:
a sensing portion comprising an audio connecting member, and a controlling portion comprising a first and a second audio sockets formed at two opposite sides thereof the first audio socket being assembled with the audio connecting member to connect the sensing portion and the controlling portion, the second audio socket adapted to be connected to a third audio socket of a mobile electronic device so that after data recorded in the electronic clinical thermometer is transmitted to the mobile electronic device, the mobile electronic device can record, analyze and display the data, and the mobile electronic device can also transmit controlling codes to the electronic clinical thermometer for replacement or update and set up time or user for the electronic clinical thermometer, wherein the sensing portion comprises a temperature sensing member electrically connected to the first audio connecting member, further comprising: a center processing unit electrically connected to the first and the second audio sockets a first signal processing unit electrically connected to the center processing unit and the second audio socket a second processing unit electrically connected to the center processing unit and the second audio socket and a temperature sensing unit electrically connected to the audio connecting member and the temperature sensing member, and electrically connected to the center processing unit through assembled the audio connecting member and first audio socket.

2. The electronic clinical thermometer in claim 1, further comprising a transmitting line electrically connected to the controlling portion and the mobile electronic device and achieving bidirectional communication.

\* \* \* \* \*